INVENTOR
WOLFGANG WEISS

BY Craig d'Antonelli

ATTORNEYS

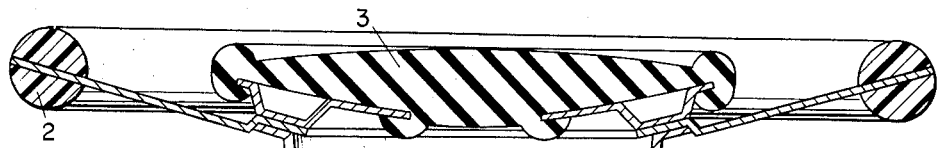
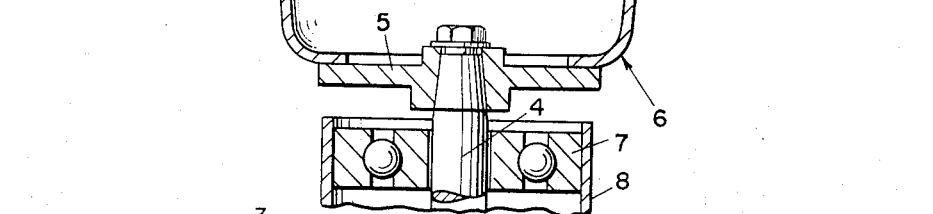
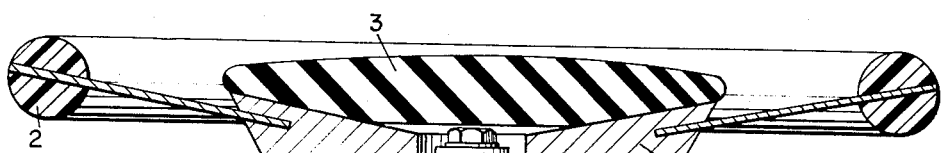
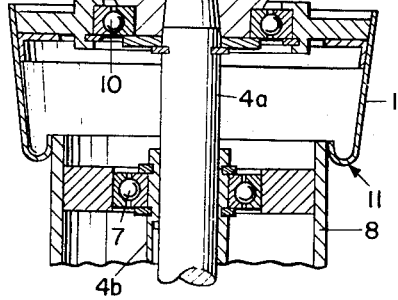

United States Patent Office 3,540,304
Patented Nov. 17, 1970

3,540,304
SAFETY STEERING FOR MOTOR VEHICLES
Wolfgang Weiss, Offingen, Wurttemberg, Germany, assignor to Daimler-Benz Aktiengesellschaft, Stuttgart-Unterturkheim, Germany
Filed Dec. 29, 1967, Ser. No. 694,628
Claims priority, application Germany, Dec. 31, 1966,
D 51,927
Int. Cl. B62d 1/18
U.S. Cl. 74—492                                    13 Claims

ABSTRACT OF THE DISCLOSURE

A safety steering installation for motor vehicles with a deformation member consisting, for example of sheet metal, that is arranged behind the steering wheel as viewed from the position of the driver, whereby the deformation member has a diameter that is larger than the diameter of the tubular casing surrounding the steering spindle, is constructed substantially smooth-walled and is so arranged between the steering wheel and the tubular casing that it is folded over the tubular casing in case of a strong, essentially axial load applied against the steering wheel.

BACKGROUND OF THE INVENTION

The present invention relates to a safety steering installation for motor vehicles in which a plastically deformable deformation member, consisting, for example, of sheet metal, is arranged between the steering wheel and the tubular casing of the steering, which deformation member in case of accidents converts at least a part of the impact energy of the driver into deformation work and thereby contributes to the protection of the driver.

Conically constructed deformation members provided with sections mutually offset in a step-shaped manner with respect to each other are already known in the prior art which are also referred to as "impact pots." The manufacture of such impact pots provided with step-shaped offsets, however, is relatively costly by reason of the work-tools required therefor.

Therebeyond, extensive tests have indicated that though such impact pots exhibit a sufficient torsional rigidity in order to transmit completely satisfactorily the steering movements to the steering spindle, that on the other hand, in case of an impact of the driver against the steering wheel which in practice never takes exactly in the axial direction, no pure telescopic-like collapse of the impact pot but a simultaneously lateral deflection thereof occurs. However, this means that the forces for the compression of the impact pot necessary by a predetermined given measure cannot be predetermined sufficiently accurately as the impact direction against the steering wheel plays thereby a decisive role.

It has therefore been also proposed already with a conically constructed deformation member arranged between the steering wheel and the steering spindle and provided with step-shaped offset sections whose diameter decreases from the steering wheel to the steering spindle, to realize the effective wall thickness of successive sections of different diameter alternately greater and smaller, starting with the section of the deformation member adjoining the steering wheel.

It was intended to be achieved with such a construction of the impact pot that in case of an impact of the driver against the steering wheel, a respective thin-walled section is practically folded into the section with greater wall thickness disposed above the same.

However, the manufacture of such impact pots is additionally rendered more difficult and more costly by the requisite different wall thicknesses compared to the types of construction described hereinabove.

SUMMARY OF THE INVENTION

Consequently, the present invention aims at avoiding these disadvantages and at creating an impact pot which can be manufactured in a simple and inexpensive manner and nevertheless satisfies all safety requirements.

Consequently, a safety steering for motor vehicles with a deformation member consisting, for example, of sheet metal is proposed in which according to the present invention the deformation member, whose diameter is larger than the diameter of the tubular casing of the steering, is constructed smooth-walled and is so arranged between the steering wheel and the tubular casing that in case of a strong, essentially axial load, i.e., of an impact of the driver against the steering wheel, it is folded over the tubular casing.

The deformation member may thereby be constructed either cylindrically or conically in such a manner that its diameter decreases from the steering wheel toward the tubular casing.

According to a preferred construction of the present invention the deformation member is secured, on the one hand, at the steering wheel, and, on the other, at a hub arranged at the head portion of the steering spindle, whereby the diameter of the hub is larger or at least equal to the outer diameter of the tubular casing and is smaller than the diameter of the deformation member.

The transition from the cylinder or from the conical part of the deformation member into the part secured at the hub can be constructed thereby as curved surface and more preferably as radius of curvature.

With a safety steering having a multipartite, telescopic steering spindle, the deformation member may be secured at its forwardly disposed end, as viewed in the driving direction, at the tubular casing whereby the steering wheel is rotatably supported with respect to the deformation member.

The diameter of the hub of the steering wheel is thereby preferably larger than the diameter of the adjoining part of the deformation member.

The transition from the cylindrical or from the conical part of the deformation member into the part secured at the tubular casing can thereby be constructed as curvature, and more particularly preferably as radius of curvature, or the deformation member can be bent off inwardly with a radius of curvature by approximately 180° within the area of its forward end, as viewed in the driving direction, and may be secured at the outer surface of the tubular casing.

Accordingly, it is an object of the present invention to provide a safety steering installation for motor vehicles which is simple in construction yet avoids by extremely simple means the aforementioned shortcomings and drawbacks encountered in the prior art.

Another object of the present invention resides in a safety steering which obviates the need for costly tools.

Still another object of the present invention resides in a safety steering having a deformation pot which is so constructed and arranged as to assure reliably a collapse thereof, converting the impact energy into deformation energy, even if the impact of the driver does not take place accurately in the axial direction.

A still further object of the present invention resides in a safety steering of the type described above which can be manufactured relatively inexpensively yet satisfies all safety requirements made thereof.

These and further objects, features and advantages of the present invention will become more obvious from the following description when taken in connection with the accompanying drawing which shows, for purposes of illustration only, several embodiments in accordance with the present invention, and wherein:

FIG. 1 is a longitudinal cross-sectional view through a safety steering with a deformation member secured at the steering wheel and at the steering spindle;

FIG. 2 is a longitudinal cross-sectional view through the safety steering of FIG. 1 and illustrating the deformation member deformed in case of an accident; and FIGS. 3 and 4 are longitudinal cross-sectional views through two further modified embodiments of a safety steering in accordance with the present invention having a deformation member secured at the tubular casing of the steering and a steering wheel rotatably supported with respect thereto.

FIG. 5 is a longitudinal cross-sectional view through a safety steering similar to FIG. 1 but wherein the deformation member is conical.

FIGS. 6 and 7 are longitudinal cross-sectional views through two further modified embodiments of a safety steering similar to FIGS. 3 and 4, respectively, but wherein the deformation member is conical.

Figure 1:
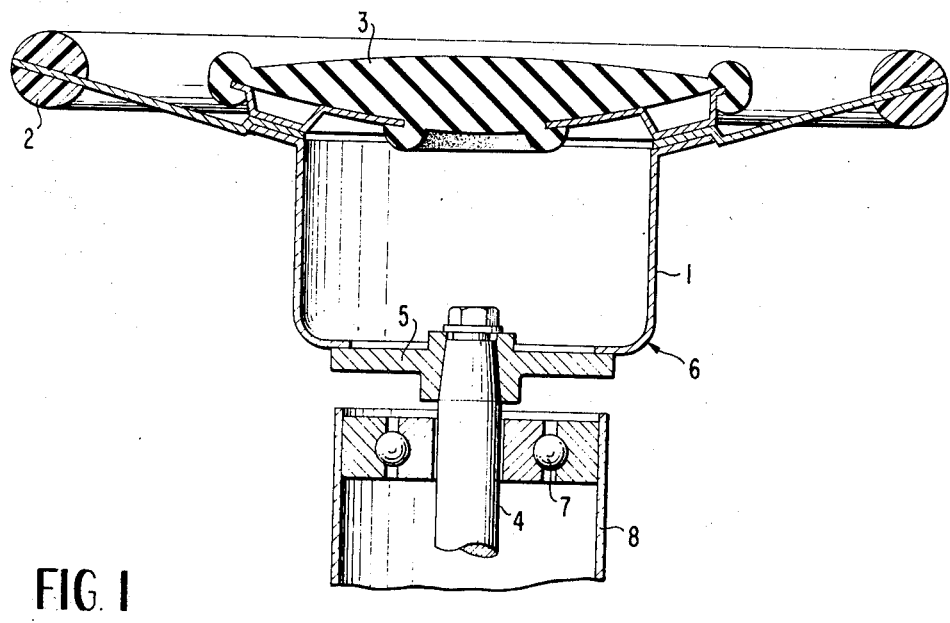
Figure 2:
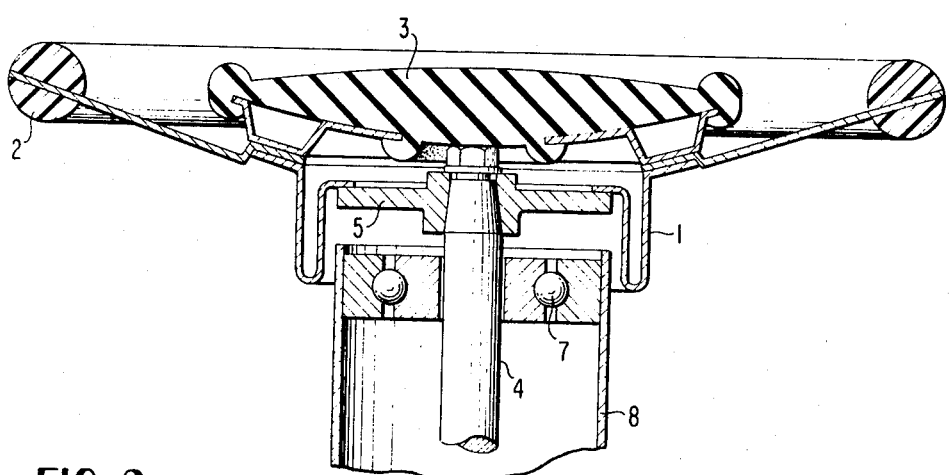

Referring now to the drawing wherein like reference numerals are used throughout the various views to designate like parts, and more particularly to FIGS. 1 and 2 thereof, the embodiment illustrated in these two figures includes a deformation member 1 which is connected, on the one hand, with the steering wheel 2 and with a padding plate 3 and, on the other, with a hub 5 secured at the steering spindle 4. The transition of the cylindrical part of the deformation member 1 into the part secured at the hub 5 is constructed as radius of curvature 6. The steering spindle 4 is rotatably supported within tubular casing 8 by way of a ball-bearing 7. The outer diameter of the hub 5 is slightly larger than the outer diameter of the tubular casing 8 in order that in case of an accident and of the impact thus caused of the driver against the steering wheel the deformation member 1 is able to fold completely satisfactorily over the tubular casing 8. The size of the radius 6 has to be matched for each practical construction to the given sheet metal thickness and strength as determined empirically.

Figure 3:
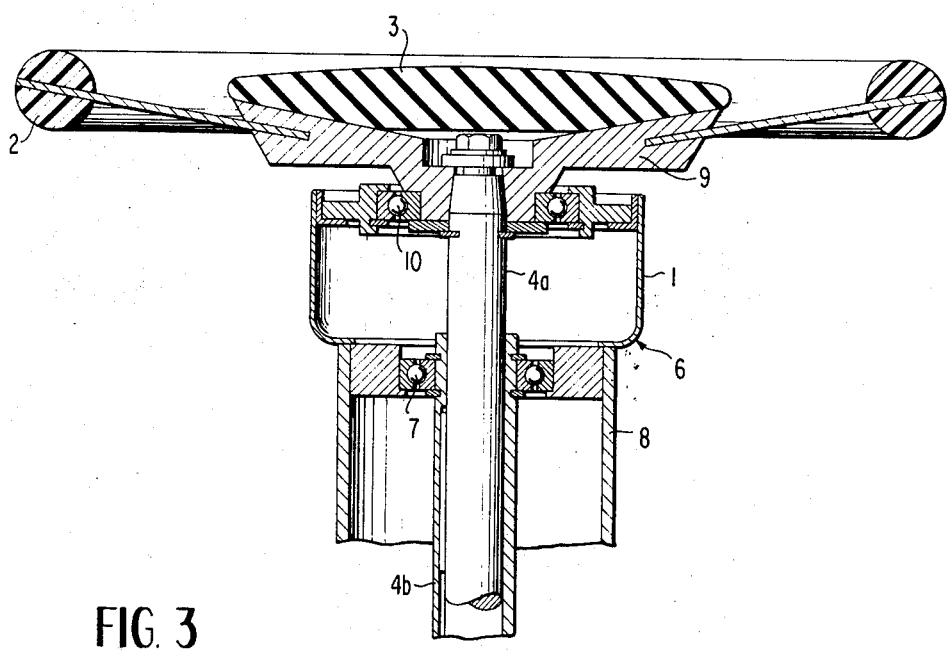
Figure 4:
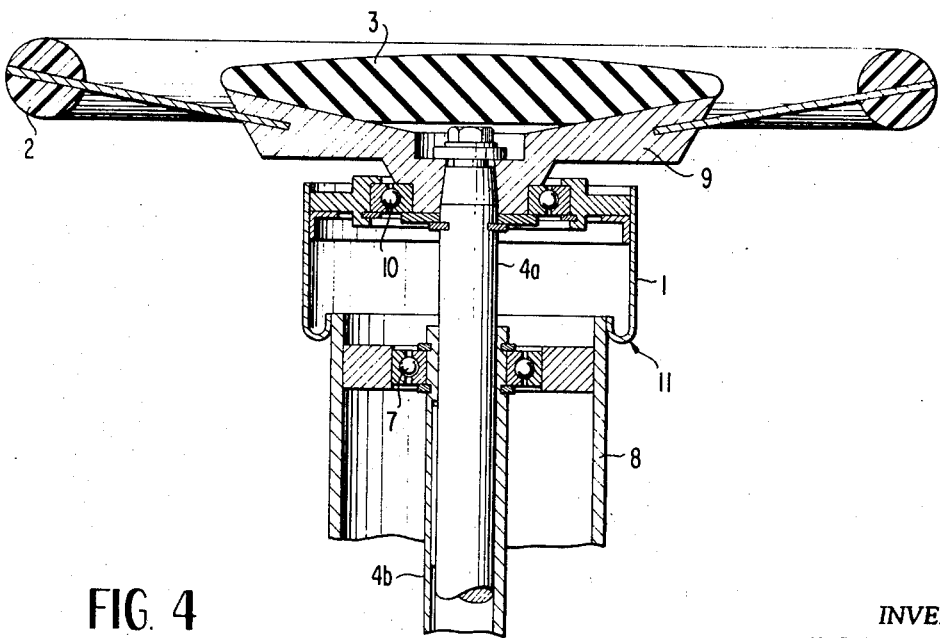

In the embodiments illustrated in FIGS. 3 and 4, the steering wheel 2 is connected by way of a hub 9 with an upper part 4a of the steering spindle 4 which is axially displaceably guided in a lower part 4b of the steering spindle 4. The hub 9 of the steering wheel 2 is covered on the side facing the driver by a padding plate 3. The steering spindle 4 is rotatably supported by way of a ball bearing 7 in the tubular casing 8. The deformation member 1 is securely connected in this construction with the tubular casing 8 and the steering wheel 2 is rotatably supported by way of a ball bearing 10 with respect to the deformation member 1.

In the embodiment according to FIG. 3, the transition from the cylindrical part of the deformation member 1 into the part secured at the tubular casing 8 is constructed as radius of curvature 6.

In the embodiment according to FIG. 4, the deformation member 1 is bent off inwardly at 11 with a radius of curvature by about 180° at its end disposed within the area of the tubular casing 8 and is secured at the outer surface of the tubular casing 8.

FIG. 5 shows an embodiment similar to FIG. 1, wherein like numerals are used to designate like parts. However, deformation member 1 is constructed conically rather than cylindrically. FIGS. 6 and 7 show embodiments that are also similar to FIGS. 3 and 4, respectively. Again, the deformation member 1 of FIGS. 6 and 7 is constructed conically.

A deformation member according to the present invention can be manufactured relatively simply and inexpensively compared to the types of construction known heretofore and can be installed into a vehicle in a space-saving manner, offers a high degree of deformation work during folding or telescoping and avoids an uncontrollable lateral deflection with impacts of teh driv- driver against the steering wheel that are not exactly axial.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the invention.

I claim:

1. Safety steering device for motor vehicles, including a steering wheel; a steering spindle; a tubular casing surrounding the steering spindle; deformation means arranged behind the steering wheel as viewed in the driving direction; the deformation means being of smooth-wall construction and operatively located substantially in series between the steering wheel and the tubular casing; at least a portion of the deformation means in proximity to the tubular casing having a diameter which is larger than the diameter of the tubular casing and having a transition constructed as a curved surface, wherein the deformation means is compressed in a controlled manner so as to roll over the tubular casing in case a substantially axial load is applied at the steering wheel.

2. A safety steering according to claim 1, wherein the deformation means is a deformation member consisting of sheet metal.

3. A safety steering according to claim 1, wherein the deformation means is constructed cylindrically at least over the largest part of its height.

4. A safety steering according to claim 1, wherein the deformation means is constructed conically at least over the largest part of its height with the diameter thereof decreasing from the steering wheel toward the tubular casing.

5. A safety steering according to claim 1, wherein the deformation means is secured, on the one hand, at the steering wheel and, on the other at a hub arranged at the head portion of the steering spindle, whereby the diameter of the hub is at least equal to the outer diameter of the tubular casing and smaller than the diameter of the deformation means.

6. A safety steering according to claim 5, wherein the deformation means is constructed cylindrically over the largest portion of its height.

7. A safety steering according to claim 5, wherein the deformation means is constructed conically at least over the largest portion of its height with the diameter thereof decreasing from the steering wheel toward the tubular casing.

8. A safety steering having a multipartite telescopic steering spindle according to claim 1, wherein said deformation means is secured at its forwardly disposed end, as viewed in the driving direction, at the tubular casing, and the steering wheel including a hub is rotatably supported with respect to the deformation means.

9. A safety steering according to claim 8, wherein the diameter of the hub of the steering wheel is larger than the diameter of the adjoining section of the deformation means.

10. A safety steering according to claim 8, wherein the deformation means is constructed cylindrically at least over the largest portion of its height.

11. A safety steering according to claim 8, wherein the deformation means is constructed conically at least over the largest part of its height with the diameter thereof decreasing from the steering wheel toward the tubular casing.

12. A safety steering according to claim 8, wherein said deformation means is bent off inwardly with a radius of curvature by about 180° within the area of its forwardly disposed end, as viewed in the driving direction, and is secured at the outer surface of the tubular casing.

13. A safety steering according to claim 1, wherein said deformation means is bent off inwardly with a radius of curvature by about 180° within the area of its forwardly disposed end, as viewed in the driving direction, and is secured at the outer surface of the tubular casing.

References Cited
UNITED STATES PATENTS

| | | | |
|---|---|---|---|
| 3,016,764 | 1/1962 | Fredericks et al. | 74—552 |
| 3,285,091 | 11/1966 | Fiala | 74—552 |
| 3,396,599 | 8/1968 | Altmann | 74—492 |
| 3,146,014 | 8/1964 | Kroell. | |
| 3,167,974 | 2/1965 | Wilfert | 74—552 |

FOREIGN PATENTS 1,342,654   9/1963   France.

MILTON KAUFMAN, Primary Examiner

U.S. Cl. X.R.

74—552; 180—78; 280—87